March 9, 1965  F. SCHÖFFEL ETAL  3,172,191
PARTING TOOL

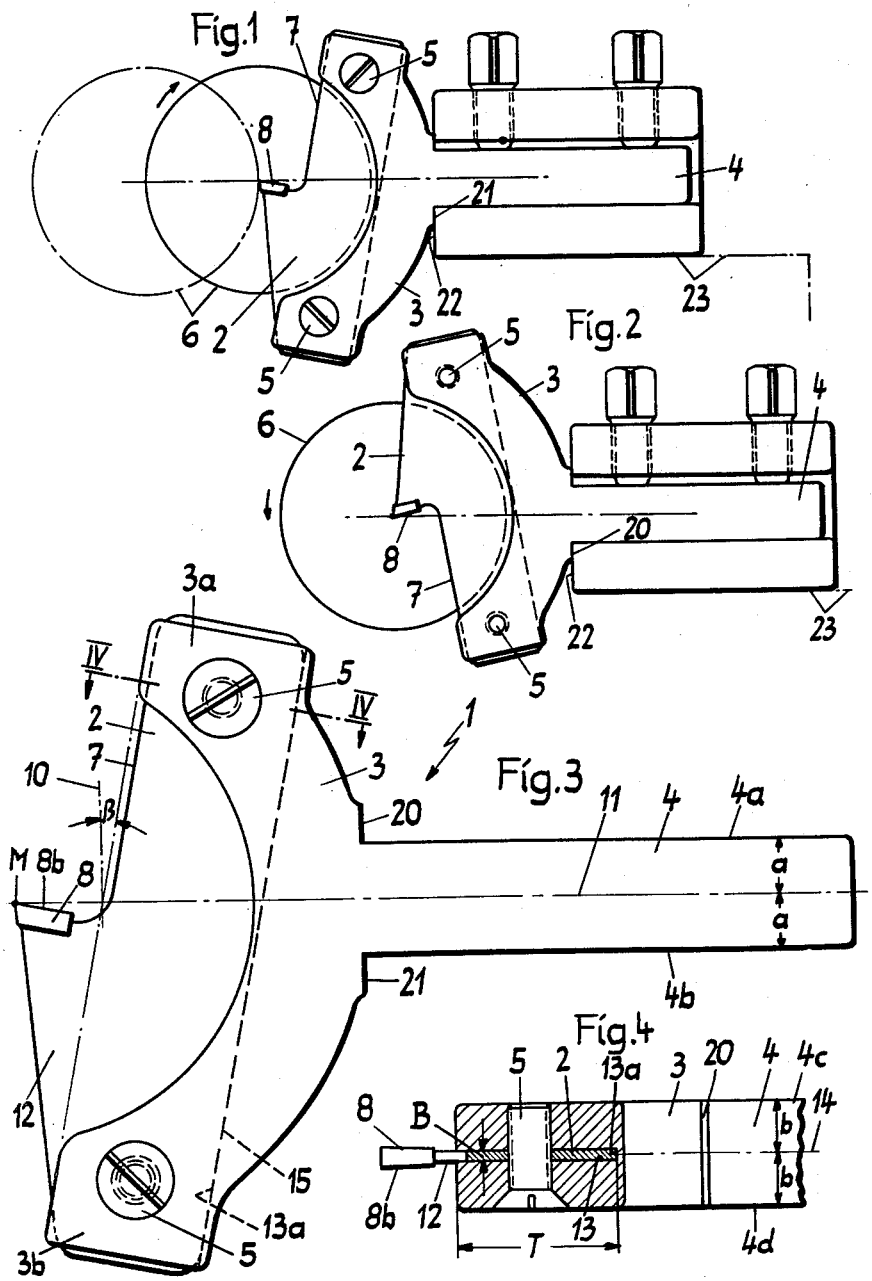

Filed Aug. 6, 1963

INVENTOR.S
Franz Schöffel and
Gustav Küffner
BY
Michael S. Striker
Attorney

United States Patent Office 3,172,191
Patented Mar. 9, 1965

3,172,191
PARTING TOOL
Franz Schöffel and Gustav Küffner, Augsburg, Germany,
assignors to Johann Wagner, Augsburg, Germany
Filed Aug. 6, 1963, Ser. No. 300,301
Claims prority, application Germany, Mar. 13, 1963,
Sch 32,924
5 Claims. (Cl. 29—96)

The invention relates to a parting tool, consisting of an arcuate holder, which comprises on its outer side a holding shank, and a strip-like parting blade, which is fixed at the ends of the holder bow and carries a widened cutter on its side facing the workpiece. Such parting tools are used in turning lathes and automatic lathes for separating parts of the workpiece or also for recessing grooves in parts of workpieces. The holding shank in this case is clamped in a suitable support of the lathe or automatic lathe.

However, it has not been possible for the prior known parting tools of the aforementioned type to be used in practice, since they have various defects. More specifically, they are unsuitable for parting workpieces which are of relatively large diameter. Furthermore, it is also impossible to reach high cutting speeds with the known parting tools. This is mainly to be attributed to the fact that the discharge of swarf or turnings is inadequate. The turnings separated from the workpiece become jammed in the recessing groove between the parting blade and the workpiece, so that overheating occurs and as a result the cutter is destroyed. Furthermore, with the prior known parting tool, the cutter is formed by the strip-like parting blade being provided at its centre with a recess. As a result of this, however, the cross-section of the parting blade is weakened, so that there is an increased danger of breakage. In addition a regrinding of the cutter is comparatively complicated. Furthermore, the insufficient support of the parting blade on the holder bow leads to oscillations which cause a fracture of the parting blade or of the cutter.

The present invention has for its object to provide a parting tool which is more especially suitable for satisfactorily parting workpieces of relatively large diameter and with which it is also possible to produce higher cutting speeds than hitherto. This is achieved according to the invention by the holder bow being arranged at such an inclination relatively to the holding shank that the connecting line of the ends of the holding bow (bow chord) is inclined by an angle ($\beta$) corresponding to the front clearance angle ($\gamma$) in relation to the vertical to the longitudinal axis of the holding shank, and that the parting blade comprises on its front side a substantially projecting shoulder carrying the cutter, the cutting surface of this cutter enclosing an angle of about 90° or more with the front of the parting blade. This construction has various advantages. In particular, a good removal of the turnings is assured. The front of the parting blade is inclined obliquely away from the workpiece. In addition, the cutter shoulder projects considerably beyond the front of the parting blade. As a result of these two steps, a sufficiently large space for guaranteeing a satisfactory removal of the turnings is provided between the front of the parting blade and the workpiece. As a consequence of the satisfactory removal of the turnings, it is possible with the parting tool according to the invention to reach high cutting speeds, so that thereby the parting time is substantially shortened. Furthermore, since the cutter is not incorporated into the parting blade, but is formed as a projecting shoulder, there is no weakening of the blade cross-section with the parting tool according to the invention and thus the danger of the said blade breaking is eliminated. Furthermore, since the cutter is arranged so as to project, it can be reground comparatively simply and also repeatedly. Since the parting blade has no weakening of its cross-section, it also has greater rigidity with respect to lateral deflection or yielding, so that it can be made with a smaller thickness. As a result, the recessing groove is narrower and accordingly the loss of material and energy consumption is smaller. Simultaneously, the turning lathe is not so heavily loaded, since the cutting pressures are smaller on account of the narrow cutter.

By means of the particular design of the new parting tool, it is also possible to separate workpieces of any desired large diameters.

Other advantages and also details of the invention are hereinafter more fully explained by reference to the constructional examples illustrated in the drawing, wherein:

FIGURE 1 is a side elevation of the new parting tool on a reduced scale, the said tool being fixed in an upright position on the support of a lathe or the like;

FIGURE 2 is a similar side elevation, in which the parting tool is arranged in the reversed position;

FIGURE 3 is a side elevation of the parting tool according to the invention to a natural scale;

FIGURE 4 is a cross-section on the line IV—IV of FIGURE 3;

Figure 5:
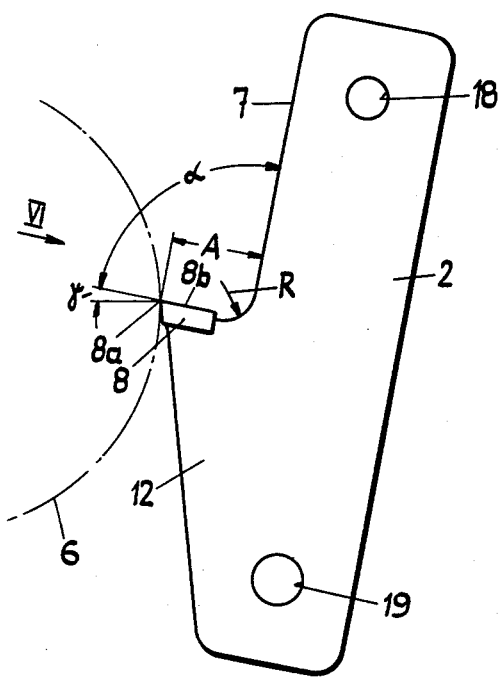
FIGURE 5 is a side elevation of the parting blade used in the new parting tool.
Figure 6:
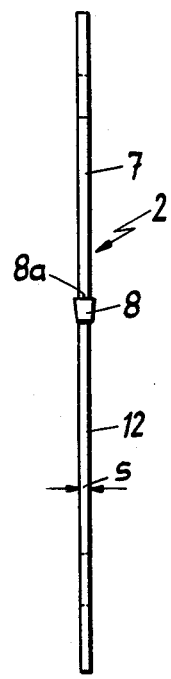
FIGURE 6 is an end view of the parting blade in the direction VI of FIGURE 5.

The parting tool illustrated in the drawing consists essentially of a holder 1 and a strip-like parting blade 2 fitted into this holder. The holder 1 comprises an arcuate holder bow 3 and a holding shank 4 fitted on the outside of the holder bow. In order to achieve greater stability of the holder, the holder bow 3 and holding shank 4 are made in one piece. The parting blade 2 fixed at the ends 3a and 3b of the holder bow 3 carries a widened cutter 8 on its face 7 facing the workpiece 6. In the constructional example illustrated, this cutter consists of a hard metal blade, which is connected to the parting blade 2 by brazing or the like.

According to the invention, the holder bow 3 is arranged inclined relatively to the holding shank 4. The connecting line (bow chord 9) of the ends 3a and 3b of the holder bow is inclined by the angle $\beta$ in relation to the perpendicular 10 to the longitudinal axis 11 of the holding shank, said angle corresponding approximately to the rake or front clearance angle $\gamma$.

The longitudinal axis 11 of the holding shank has the same spacing $a$ from the two supporting surfaces 4a and 4b of the holding shank 4. The rake angle $\gamma$ is indicated in FIGURE 5 and is generally directed towards the material to be removed by machining. This angle can be between 0 and 20°, but negative angles are also possible. However, it has been found in practice that a rake angle between 12 and 20° is suitable for practically all materials when cutting with the new parting tool. In the constructional examples which are illustrated, the centre point M of the holder bow 3 does not lie on the longitudinal axis 11 of the holding shank 4, but it also coincides simultaneously with the cutting edge 8a of the cutter 8. If the centre of the arcuate holder 3 is disposed on or in the vicinity of the cutting edge 8a, this has the advantage that the workpiece can enter completely into the bow during the parting operation, as shown in FIGURES 1 and 2. It is therefore possible to machine large diameters with a comparatively small holder. A small holder has the advantage that the parting blade is held in the vicinity of its cutter. The larger the bow, the greater is the distance of the cutter from the fixing point in the holder and thus the thicker must the parting blade be made.

According to the invention, the parting blade comprises on its front side 7 a substantially forwardly projecting shoulder 12 carrying the cutter 8. This shoulder guarantees a satisfactory support of the cutter 8. Furthermore, the cutting surface 8b of the cutter 8 encloses an angle of 90° or more with the front face 7 of the parting blade 2. The shoulder 12 and the cutter 8 are arranged to project to such an extent beyond the front face 7 of the parting blade 2 that the distance A between the front face 7 and the front cutting edge 8a is as a maximum 10 times and as a minimum 3 times the thickness of the parting blade. In the constructional example which is illustrated, the distance A is about 18 mm., the thickness of the parting blade being 2.5 mm. However, the spacing is reduced somewhat by the regrinding of the cutter 8.

Due to the oblique disposition of the parting blade 2 in the holder bow 3 and due to the fact that the front face 7 encloses an angle of about 90° with the cutting surface 8b, a large space is provided between the parting blade 2 and the workpiece 6, as can be seen from FIGURE 5, it being possible for the turnings detached from the workpiece to pass unobstructed through the said space, this discharge of the turnings not only being favoured by the width of the space, but also by the fact that the space is enlarged in wedge formation in an outward direction. The projecting shoulder 12 also has the advantage that not only can the cutter 8 be reground comparatively easily, but can also be reground very frequently. The access of the grinding wheel to the cutting surface 8b is not impeded in any way, since the angle is approximately 90° or more. Therefore, the cutting surface 8b can for example be reground in a simple manner with a cup-type grinding wheel.

The shoulder 12 carrying the cutter advantageously merges with a radius R of at least 8 mm. into the front face 7 of the parting blade. This radius R forms a guide surface and a device for breaking the chips or turnings which are detached from the workpiece. Such a chip breaker or a guide surface is more especially necessary for materials producing long turnings.

Figure 7:
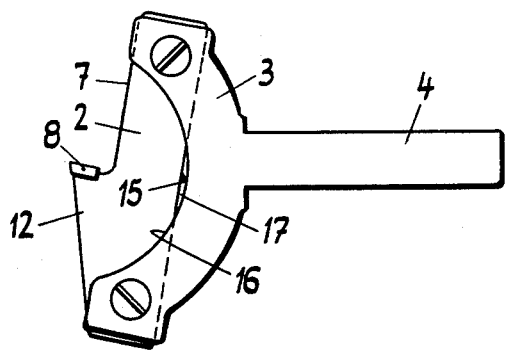
FIGURE 7 is a second constructional example in side elevation and on a reduced scale.

As can be more especially seen from FIGURE 4, the holder bow 3 comprises a slot 13 for accommodating the parting blade, the said slot advantageously extending in the mean longitudinal plane 14 of the holding shank 4 and the width B thereof corresponding to the thickness S of the parting blade 2. The mean longitudinal plane 14 has the same spacing b from both lateral surfaces 4c and 4d of the holding shank 4. The width of the slot is preferably so chosen that the parting blade is arranged as a tight fit in the slot 13 and can only be pushed into or removed from this slot by overcoming a certain clamping force of the said slot. As can moreover be seen from FIGURES 3 and 4, the depth T of the slot is so large that the parting blade is arranged completely countersunk in the ends 3a, 3b of the holder bow. By this means, a reliable support of the parting blade at both ends is guaranteed. The reliable support can also be further improved by making the slot 13 so deep and the parting blade 2 so wide that the blade extends over the entire surface enclosed by the holder bow 3, as is the case in the constructional examples which are illustrated. The back or spine 15 of the blade is supported over the major part of its length in the slot 13 of the holder bow. With the constructional example which is illustrated in FIGURES 1 to 4, the blade spine 15 is supported over its entire length in the holder bow 3. As a result, the parting blade is held satisfactorily and more especially a lateral deviation and also an oscillation of the parting blade is avoided. However, it is sufficient in certain cases for the spine 15 of the parting blade not to be held over its entire length, but only over a major part of its length, in the slot of the holder bow. Such a constructional example is shown in FIGURE 7. This constructional example has the advantage that a segmental opening 17 exists between the blade spine 15 and the inner surface 16 of the holder bow 3 in the middle portion of the latter. It is possible for a screw driver or a similar tool to be inserted into this opening and used for pushing the parting blade out of the slot.

Furthermore, the slot 13 is advantageously so formed that the blade spine 15 rests on the base 13a of the slot. In this manner, a good power transmission is achieved between the parting blade and the holder bow and moreover the clamping screws 5 are not so heavily stressed.

In the constructional example illustrated, the parting blade 2 is held by means of the two clamping screws 5 at the ends 3a and 3b of the holder bow. It is expedient in this case for the screw disposed above the cutting surface 8b to be arranged with a tight fit in the hole 18 provided for it in the parting tool 2, so that it is not possible for the said tool to be displaced at this point. The hole 19 situated beneath the cutting surface 8b is given a somewhat larger diameter than the diameter of the fixing screw 5, so that there is play between the two parts. If the parting blade expands somewhat because of heating and loading, the said blade 2 can be displaced somewhat in the lower part of the holder bow 3, so that a lateral buckling of the parting blade is also prevented.

Furthermore, the cutting edge 8a of the cutter 8 is preferably arranged on the longitudinal axis 11 of the holding shank 4, as can be seen more especially from FIGURE 3. It is thus possible for the parting tool, as also shown in FIGURE 1, to be used in an upright position or also, as shown in FIGURE 2, in the inverted position, without the location of the cutting edge 8b being changed in relation to the workpiece axis. The upright position of the parting tool as shown in FIGURE 1 is suitable for workpieces which have small diameters up to about 50 mm., whereas workpieces having diameters greater than 50 mm. can be better machined with the parting tool in the reverse position, as shown in FIGURE 2, since in this position the chips or turnings detached from the workpiece can drop out downwardly.

In order to facilitate the setting up of the new parting tool, abutment surfaces 20 and 21 are also provided at the transition of the holding shank 2 into the holder bow 3, the said surfaces extending perpendicularly to the longitudinal axis of the holder. These abutment or bearing surfaces co-operate with a corresponding bearing surface 22 on the support 23, the bearing surface 22 of the said support extending parallel to the workpiece axis. If now the parting tool is forced with its bearing surface 21 against the bearing surface 22 of the support, the parting tool is so aligned that its cutting edge 8a is likewise parallel to the workpiece axis and the parting tool is perpendicular thereto. If the parting tool is rotated, it is the bearing surface 20 which becomes operative. The bearing surfaces 20 and 21 also serve as support surfaces which prevent a displacement of the parting tool in relation to the support 23.

The present invention is not to be limited to the constructional examples which are illustrated in the drawing. For example, it is also possible to provide an angle larger than 90° between the cutting surface and the front face of the parting tool. Furthermore, the slope of the ends of the holder bow in relation to the perpendicular to the longitudinal axis of the shank does not always have to correspond exactly to the rake angle. In addition, it is possible for the cutter and the parting blade to be made in one piece from one and the same material.

What we claim is:

1. A parting tool comprising, in combination, an arcuate holder having a longitudinal plane of symmetry and being formed in said plane of symmetry with a slot extending longitudinally through said holder; a shank integral with said arcuate holder projecting from the outer side thereof inclined to said slot and arranged symmetrically with respect to said plane of symmetry; and a strip-like parting blade located in said slot and fixed at opposite ends to said arcuate holder and carrying a widened cutter fixed to a front portion thereof, said slot having a width substantially equal to the thickness of said blade so that the latter is tightly fitted in said slot and said slot having a depth so that the opposite ends of said blade are over the whole width thereof completely confined in said slot and so that the rear edge of said blade is at least over a major portion thereof held in said slot.

2. A parting tool as set forth in claim 1, wherein said slot has a straight bottom face and said blade has a straight rear edge abutting against said bottom face.

3. A parting tool as set forth in claim 2, wherein said arcuate holder has a concave face extending substantially through a third of a circle, the bow cord of said concave face extending inclined to the axis of said shank at such an angle that a line normal to said axis includes with said cord an angle substantially equal to the front clearance angle of said cutter, said cutter being carried by a projection of said blade and the cutting surface of said cutter including an angle of substantially 90° with the front edge of said blade.

4. A parting tool as set forth in claim 3, wherein the front edge of said cutter is spaced from the front edge of said blade a distance of at least three times and at most ten times the thickness of said blade.

5. A parting tool as set forth in claim 3, wherein the cutting edge of said cutter is located in a plane passing through the axis of said shank.

References Cited by the Examiner

UNITED STATES PATENTS

| | | | |
|---|---|---|---|
| 981,587 | 1/11 | Morris | 29—96 |
| 2,676,386 | 4/54 | May | 29—96 |

FOREIGN PATENTS

| | | |
|---|---|---|
| 1,442 | 1/15 | Great Britain. |
| 1,012,480 | 4/52 | France. |
| 150,429 | 3/53 | Australia. |

WILLIAM W. DYER, Jr., *Primary Examiner.*